# United States Patent Office 3,651,180
Patented Mar. 21, 1972

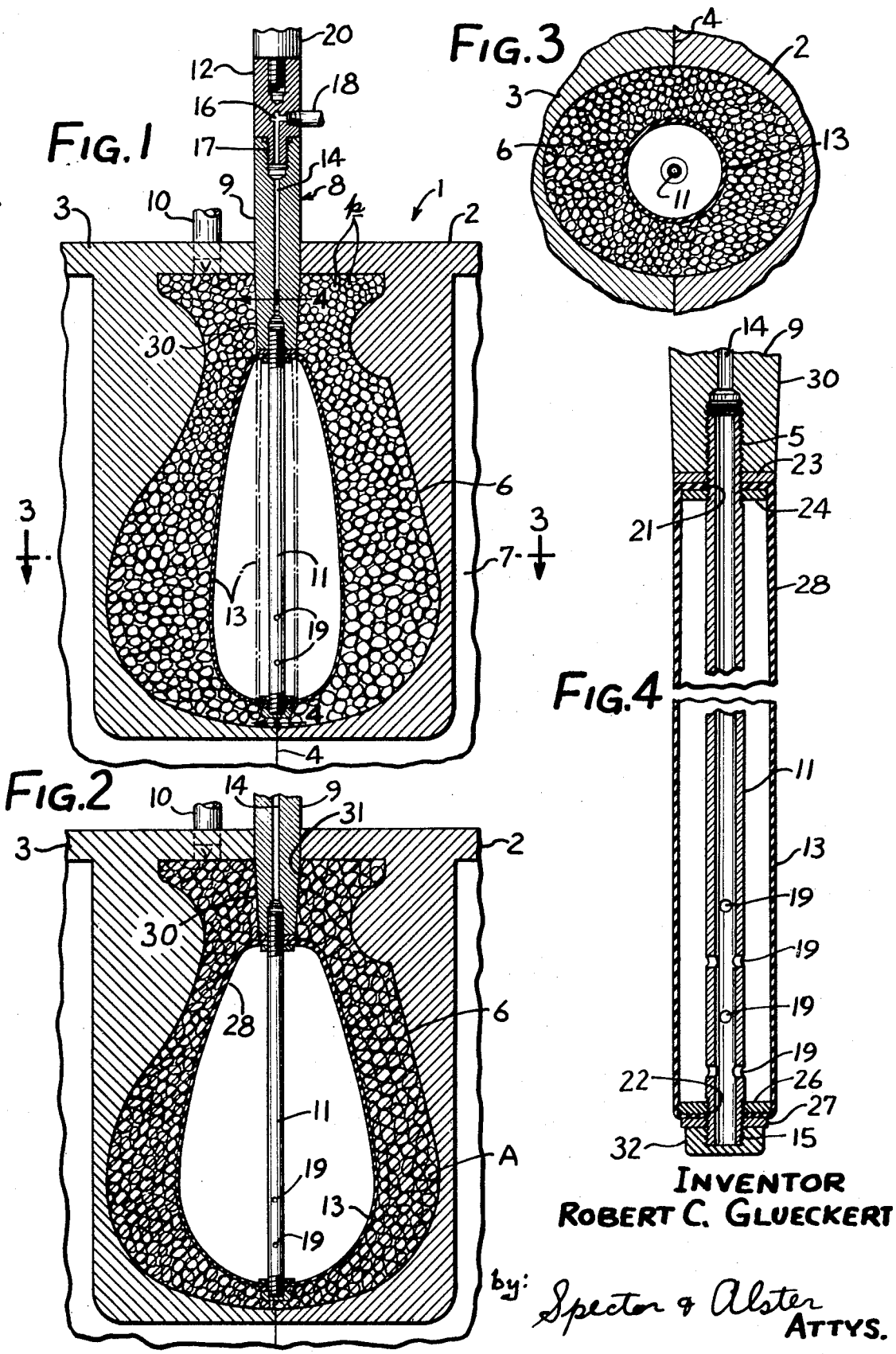

3,651,180
METHOD OF MOLDING EXPANDABLE POLY-STYRENE PARTICLES USING AN INFLATABLE CORE IN THE MOLD CAVITY
Robert C. Glueckert, Mount Prospect, Ill., assignor to Foam Forms, Inc.
Filed Aug. 8, 1968, Ser. No. 751,189
Int. Cl. B29d 27/00
U.S. Cl. 264—51                                              7 Claims

ABSTRACT OF THE DISCLOSURE

A foam molding method utilizing an inflatable core removably positioned in a mold cavity. Pre-expanded foamable polystyrene particles of plastic are introduced into the mold and around the inflated core and are heated, expanding the particles and forming a cellular article with a hollow corresponding to the shape of the inflated core. The mold parts are separated, the core is deflated, and the molded article is stripped from the core. The inflatable core contains a core pin which fixes the position of the core element within the mold cavity.

---

This invention relates generally to the molding of plastics, and more particularly to a method and apparatus for foam molding hollow articles.

It is an object of this invention to provide a method and apparatus that utilizes an inflatable core in the molding of hollow articles from particles or granules of plastic that contain a foaming agent. In accordance with a preferred embodiment of the invention, a partially inflated core element is positioned in a mold cavity and the plastic particles, such as pre-expanded polystyrene pellets, are introduced into the mold between the core element and the mold cavity wall. The core element is further inflated and the mold is heated to cure the plastic. The heat and foaming agent causes the plastic particles to expand into conformance with the core element and mold cavity and coalesce to form a unitary form-sustaining cellular plastic article. After the curing has been completed and the plastic has cooled sufficiently, the mold parts are separated and the core element is deflated to allow the plastic article and core to be separated.

The foam plastic is generally an excellent heat insulator. By making the article hollow there is a lesser thickness of material to be heated and cooled than in the case of a foam plastic article of the same external shape but without the hollow. Accordingly, it is a further object of this invention to provide a method and apparatus of the type stated in which foam molded articles may be more quickly heat-cured and also more quickly chilled before removal from the mold, and thereby speed production of such articles.

It is a still further object of this invention to provide a method and apparatus of the type stated in which the inflatable core element may be shaped to provide a preselected contour of the hollow and wall thickness of the molded article. Such contour may be one that prevents retraction of the core element from the molded article unless the core element is deflated, thereby making the core element useful in situations where a solid core would not be suitable.

An additional object of the invention is in the provision of a core element which in the deflated condition is a stretched tube that allows the casting to be stripped therefrom quickly and easily.

Yet another object of the invention is to provide a core of the type stated that may be readily embodied into existing molding machinery.

The attainment of the above and further objects of the invention will be apparent from the following description taken in conjunction with the accompanying drawing forming a part thereof.

In the drawing:
FIG. 1 is a sectional view of apparatus constructed in accordance with the present invention and showing an intermediate stage in the method of the invention;
FIG. 2 is a sectional view similar to FIG. 1 but showing a completed foam-molded article in the mold;
FIG. 3 is a fragmentary sectional view taken along line 3—3 of FIG. 1; and
FIG. 4 is a fragmentary sectional view, on an enlarged scale, taken along line 4—4 of FIG. 1 and showing the novel core that forms part of the present invention.

Referring now in more detail to the drawing, 1 designates molding apparatus comprising separable mold sections 2, 3 which are adapted to meet along a mold parting line 4 when the mold sections 2, 3 are brought together. The mold sections 2, 3 have cavity portions that provide a mold cavity wall 6 of a contour appropriate to the external shape of the article A to be foam-molded. By way of example, the cavity wall 6 herein illustrated is contoured to mold a wig form but it is within the scope of the invention to mold other articles as well. The mold sections 2, 3 conventionally embody a chamber 7 to which steam may be circulated to heat the foamable plastic within the mold cavity.

The plastic used for the molding may be a polystyrene resin that incorporates a known foaming agent. The resin may be in the form of pellets $p$ that have been pre-expanded in a known manner to the desired density prior to the introduction of the pellets into the mold cavity after which they are heated so that they expand and coalesce and finally form a unitary mass that takes the shape of the mold cavity. These pellets $p$ are preferably blown into the mold cavity through a pipe 10 by gas under pressure therein. A valve V may be opened and closed appropriate times during the molding cycle to admit and shut off the supply of pellets $p$.

Provided for cooperation with the mold sections 2,3 is a core assembly 8 that comprises a core pin 9, a tube 11, a core pin extension 12, and an inflatable balloon-like core element 13. The tube 11 is threaded at its opposite ends 5, 15, and one of the ends 5 is threaded into one end of the core pin 9 so that the bore 14 of the core pin 9 is in communication with the bore of the tube 11. The extension 12 has a passageway 16 and a nipple 17, the latter being threaded into the opposite end of the core pin 9. A source of air or other gas may be connected by a pipe 18 to the extension 12. The tube 11 has ports 19 that open from the tube bore to the interior of the inflatable core element 13. The core 8 may be attached to a rod 20 that is connected to suitable mechanism of known type for moving the core 8 vertically and laterally.

The core element 13 may be of any suitable rubber or rubber-like material. The element 13 has opposed holes 21, 22 through which the tube 11 projects. Washers 23, 24 are threaded onto the end 5 of the tube 11. These washers 23, 24 are on the inside and outside respectively of the core element 13 and serve to clinch it in place on the tube 11. The other threaded end 15 of the tube 11 also has washers 26, 27 on the inside and outside of the core element 13 for clamping it in place at that end of the tube 11. A cap nut 32 closes the opening at the tube end 15. The lower end of the inflatable core element is thus fixed to the lower end of the tube 11 of the core assembly. The core element may be molded or otherwise formed so that when it is inflated it assumes the predetermined shape that is desired for the hollow or cavity to be formed in the foam-molded article. For instance, the core element 13 may be molded so that it has a portion 28 which is of greater wall thickness than that of the other part of the element 13. This causes the element 13 to yield more in the thin-walled portion than in the thicker walled portion 28 during inflation. In the example shown, the core element 13 will inflate to the pear or gourd shape shown.

The core pin 9 has an external taper 30 toward the tube 11, and the core element 13 preferably has a free or unstretched length between holes 21, 22 that is a fractional part of the distance between the threaded ends 5, 15 of the tube 11. Thus, when the core element 13 is assembled with the tube 11, the core element 13 must be stretched. This results in the core element 13 assuming the taut cylindrical tubular shape shown in FIG. 4 and is broken lines in FIG. 1 when the core element 13 is deflated. The outside diameter of the deflated core element will be approximately the same as the minimum external diameter of the core pin 9, which enables the core element 13 to be withdrawn from the tapered hole 31 in the molded article A that is formed by the tapered part 30 of the core pin 9.

In use, the mold sections 2, 3 are closed around the core pin and the core element 13 is partially inflated as shown in FIG. 1. Pellets of the pre-expanded resin are introduced into the mold cavity from the pipe 10 to fill the mold cavity and then the core element 13 is fully inflated to a position shown in FIG. 2. The heat applied to the mold by the steam in the chamber 7 heats the plastic, causing it to expand and coalesce and form the cellular plastic article A. After the plastic in the mold has cooled, the mold is opened by retracting one of the mold sections 2 from the other section 3 an amount sufficient to enable the core 8 to be shifted to the right (FIG. 1) to clear the article A from the mold section 3. Mechanism for opening and closing the mold and for moving the core 8 during each molding cycle is known in the art. Because of the shape of the hollow that is formed in the article as a result of the inflation of the core element 13, the molded article A and core element 13 cannot be separated until the core element 13 is deflated. This, however, is done by withdrawing the gas from the core element outwardly through the pipe 18. The molded piece A may then be separated from the core element 13 since the deflated diameter of the core element 13 will permit its withdrawal through the hole 31.

The precise constructions herein shown are illustrative of the principles of the invention. What is considered new and sought to be secured by Letters Patent is:

1. A process for foam molding a hollow plastic article comprising providing a mold with separable mold parts that form a cavity and an inflated core assembly that occupies a fractional part of the volume of the mold cavity, said assembly including an inflatable core element that extends as a sleeve over one end of an additional core element that projects from within said mold cavity outwardly thereof, and by means of said additional core element fixing the position of the end of the inflatable core element within the mold cavity, introducing into the mold cavity between the core and mold cavity wall foam-expansible polystyrene plastic particles, expanding the plastic particles against the core and the mold cavity wall so that the particles coalesce and form a unitary cellular article of plastic having an opening formed by said additional core element where said additional core element projects into the mold cavity and having a hollow formed by a wall that is a counterpart of a surface of the inflated core element and which counterpart surfaces prevent separation of the core and article without deflation of the inflatable core element, the part of the core that is within the mold cavity, when deflated, being of a size that can pass through said opening in the molded product to permit separating the product from the assembled core, and separating the article from the mold and the core by steps including separating the mold parts and deflating the inflatable core element and withdrawing the core assembly through said opening.

2. A process according to claim 1 in which the inflatable core element is inflated by introducing fluid therein through said additional core element.

3. A process according to claim 1 wherein the foam expansible plastic particles are polystyrene material incorporating a foaming agent.

4. A process according to claim 3 wherein heat is applied to the mold parts externally of the mold cavity to expand said particles.

5. A method of foam molding a hollow plastic article comprising providing a mold with separable mold parts that form a cavity, providing a core assembly having a core pin and an inflatable core element attached to the core pin and enveloping a portion of the core pin between the end thereof and an intermediate part thereof and which enveloping portion of said inflatable element in its deflated condition is a tubular member substantially no greater in external diameter than that of the minimum external diameter of the core pin and which enveloping portion of said inflatable element in its inflated condition has a maximum diameter which is substantially greater than the minimum diameter of the core pin, positioning the inflated element and core pin in the mold so that they occupy a fractional part of the volume of the mold cavity with the pin projecting through the wall of the mold and the core assembly fixes the position of the end of the inflatable core element within the cavity, introducing into the mold cavity between the core and mold cavity wall foam-expansible polystyrene plastic particles, expanding the plastic particles against the core and the mold cavity wall so that they coalesce and form a unitary cellular article of plastic with a hollow having an enlarged portion of a shape which includes a counterpart of a surface portion of the inflated element and a reduced portion of a shape which is a counterpart of a surface portion of the core pin, and separating the article from the mold and core by steps including separating the mold parts, deflating the inflatable core element and withdrawing the deflated core assembly through said reduced portion.

6. A method according to claim 5 further including maintaining the wall of said inflatable core element in tension in the collapsed condition.

7. A method according to claim 5 in which the particles are of polystyrene and wherein heat is applied to the mold parts externally of the mold cavity to expand said particles.

References Cited

UNITED STATES PATENTS

| 1,566,903 | 12/1925 | Durst | 249—65 X |
| 2,929,109 | 3/1960 | Cresap | 264—314 X |
| 2,949,658 | 8/1960 | Conn | 249—65 X |
| 2,981,984 | 5/1961 | Orr | 264—45 X |
| 3,135,640 | 6/1964 | Kepka | 264—45 X |
| 3,225,124 | 12/1965 | Wallace | 264—45 |
| 3,255,286 | 6/1966 | Luc-Belmont | 264—51 X |
| 3,530,208 | 9/1970 | Rausing | 264—45 |

DONALD J. ARNOLD, Primary Examiner

P. A. LEIPOLD, Assistant Examiner

U.S. Cl. X.R.

18—5 P, 45 R, Dig. 14; 264—53, 314; 249—65